US012304634B2

(12) United States Patent
Rowe et al.

(10) Patent No.: US 12,304,634 B2
(45) Date of Patent: May 20, 2025

(54) MODULAR REFRESHMENT CENTER (71) Applicant: Textron Aviation Inc., Wichita, KS (US)

(72) Inventors: Frank Joseph Rowe, Wichita, KS (US); Michael Scott Robinson, Wichita, KS (US); David Wayne Davis, Wichita, KS (US); JoAnn Kimbell, Wichita, KS (US); Stephen Fagan, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 595 days.

(21) Appl. No.: 17/668,215

(22) Filed: Feb. 9, 2022

(65) Prior Publication Data
US 2022/0267007 A1 Aug. 25, 2022

Related U.S. Application Data (63) Continuation-in-part of application No. 15/795,707, filed on Oct. 27, 2017, now Pat. No. 11,273,915.

(60) Provisional application No. 62/413,683, filed on Oct. 27, 2016.

(51) Int. Cl.
B64D 11/04 (2006.01)
A47B 47/00 (2006.01)
(52) U.S. Cl.
CPC .............. B64D 11/04 (2013.01); A47B 47/00 (2013.01)
(58) Field of Classification Search
CPC ................................ A47B 47/00; B64D 11/04

USPC ........................................................ 312/351.1
See application file for complete search history.

(56) References Cited

U.S. PATENT DOCUMENTS

| 3,334,953 | A | * | 8/1967 | Becker | G07F 11/44 |
| | | | | | 312/257.1 |
| 4,433,881 | A | * | 2/1984 | Witten | A47B 96/00 |
| | | | | | 312/107 |
| 4,778,089 | A | | 10/1988 | White et al. | |
| 5,337,905 | A | | 8/1994 | Gast | |
| 8,387,916 | B2 | | 3/2013 | Baatz et al. | |
| 9,321,533 | B2 | | 4/2016 | Cuddy et al. | |
| 9,535,989 | B2 | | 1/2017 | Byers | |
| 9,661,920 | B2 | | 5/2017 | Ahart | |

(Continued)

FOREIGN PATENT DOCUMENTS

WO 2015049059 A1 4/2015

Primary Examiner — James O Hansen
(74) Attorney, Agent, or Firm — Avek IP, LLC (57) ABSTRACT A substructure in an aircraft cabin includes a drawer-insert accepting portion that defines multiple racks. Each rack may receive an exchangeable drawer insert. A module-accepting portion of the substructure defines an opening that includes a supporting surface, a back wall which extends upward and outward, and a lateral side wall. A module is provided for optionally installing in the module-accepting portion. The module has concealed areas upon installing that include: (i) a base adapted to rest on the supporting surface, (ii) a side wall adapted to abut the lateral side wall, and (iii) a rear wall adapted to abut the back wall. The module has exposed surfaces upon installing that are adapted to match an existing profile of the drawer-insert accepting portion. The module-accepting portion is configured for stowing cargo in a first mode and for receiving the module in a second mode. The module may include a locking assembly.

10 Claims, 13 Drawing Sheets (56) References Cited

U.S. PATENT DOCUMENTS

| | | |
|---|---|---|
| 10,017,252 B2 | 7/2018 | Jobst et al. |
| 2009/0144939 A1* | 6/2009 | Ramsauer ............... E05B 15/02 |
| | | 292/336.3 |
| 2009/0230711 A1* | 9/2009 | Kittelson .................. B60R 7/04 |
| | | 312/245 |
| 2009/0267564 A1 | 10/2009 | Gerber |

* cited by examiner

MODULAR REFRESHMENT CENTER

CROSS-REFERENCE TO RELATED APPLICATIONS

This application is a continuation-in-part application claiming benefit of U.S. patent application Ser. No. 15/795,707 entitled "Modular Refreshment Center" and filed on Oct. 27, 2017, which in turn claims the benefit of U.S. Provisional Application No. 62/413,683 entitled "Modular Refreshment Center" and filed on Oct. 27, 2016, both of which are herein incorporated by reference in their entirety.

BACKGROUND

1. Field

Embodiments of this disclosure relate generally to storage systems for aircraft cabins, and more specifically to modular systems having exchangeable drawer inserts and other modular components for enabling adaptable and customizable aircraft cabins.

2. Description of the Related Art

None.

SUMMARY

In some aspects, a locking assembly for a modular storage unit includes: a lever arm having a secured end and a free end, the secured end being mounted inside a base of the modular storage unit; an opening in a side wall of the modular storage unit, wherein the free end is configured to extend through the opening; a protruding member that extends downward beneath a bottom side of the lever arm; a hole in the base configured to receive the protruding member; and a plate mounted to a supporting surface, wherein the protruding member is configured to be seated adjacent the plate and touching the supporting surface when the modular storage unit is installed on the supporting surface thereby securing the modular storage unit.

In some aspects, a locking assembly for a modular storage unit includes: a slotted protrusion that extends beneath a base of the modular storage unit, wherein the slotted protrusion includes a slot facing a first direction; a recessed receptacle housed within a supporting surface, wherein the recessed receptacle includes a crossbar configured to insert into the slot when the modular storage unit is installed; a lever arm having a secured end and a free end, the secured end being mounted inside a base of the modular storage unit and the free end extending through an opening in a side wall of the modular storage unit, wherein the free end is configured to be raised for releasing the modular storage unit; a protruding member that extends downward beneath a bottom side of the lever arm and through a hole in the base; and a plate mounted to the supporting surface, wherein the protruding member is configured to be seated against the supporting surface adjacent the plate when the modular storage unit is installed thereby securing the modular storage unit from moving in a second direction opposite the first direction.

In some aspects, a storage system for an aircraft cabin includes: a frame having a curved back wall, the frame being configured for securely installing against an interior wall inside an aircraft cabin, the frame having a first portion and a second portion adjacent the first portion; the first portion having a plurality of racks; a plurality of exchangeable drawer inserts configured for inserting into the plurality of racks, respectively; the second portion providing an open cabinet lacking an exterior side wall; an exchangeable modular storage unit, wherein the second portion remains open for receiving cargo in a first mode, and the exchangeable modular storage unit is installed in the open cabinet in a second mode; and a locking assembly configured for securing the exchangeable modular storage unit to the second portion while in the second mode.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Currently available aircraft cabinets are restricted in functionality based on their certification. Modification of the cabinets requires high replacement costs and lengthy time delays because each replacement cabinet requires special tooling for manufacture plus certification for flight. What is needed, especially for smaller aircraft, is a system that provides an ability to alter available storage configurations to accommodate versatile functions, such as those needed for different flight plans, variable numbers of passengers, and customer preferences.

Figure 1:
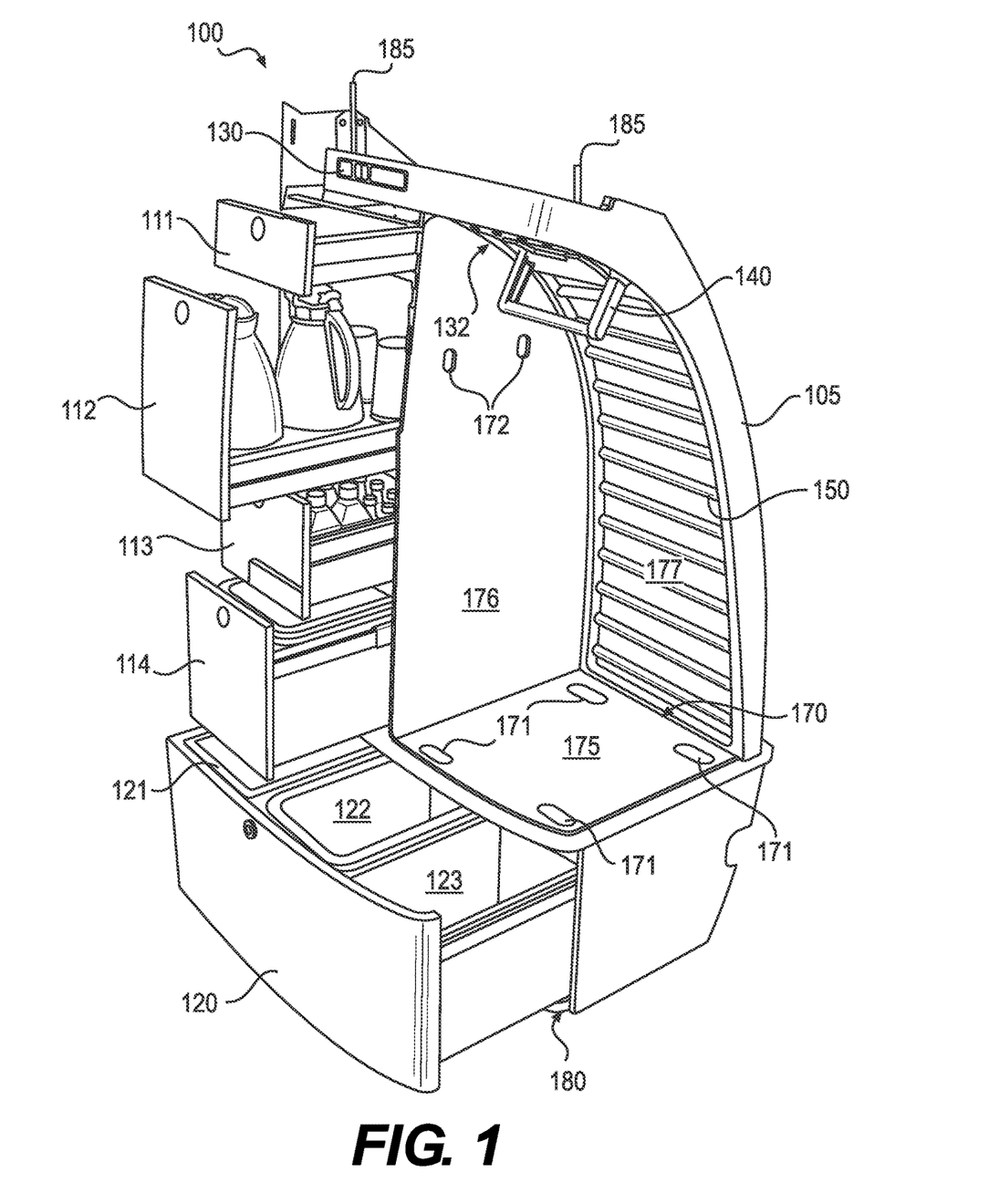
FIG. 1 is a perspective view of a modular refreshment center, in an embodiment.

FIG. 1 is a perspective view of an exemplary modular refreshment center 100. Modular refreshment center 100 provides a common substructure 105 configured to accommodate a plurality of drawer inserts as well as additional modular features for storage and amenities. Example drawer inserts include first, second, third, and fourth drawer inserts 111, 112, 113, and 114. Drawer inserts 111-114 may include standard frames that correspond with common attachment points of substructure 105 for enabling rapid exchange with compatible inserts that provide alternative interior configurations. As depicted in FIG. 1, drawer inserts 111-114 are aligned vertically with respect to one another. However, other arrangements are possible without departing from the scope hereof. An open storage bin 120 is provided for additional storage, and an open cabinet 170 is provided, as further described below.

Substructure 105 is for example a frame designed to meet all mandated structural loads required by relevant aircraft certification authorities. Connectors 185 are for example quick-release pin mechanisms used to attach substructure 105 to the aircraft. Any aircraft outfitted with substructure 105 may exchange inserts and modular units with any other similarly outfitted aircraft.

First drawer insert 111 may be configured with a bin having one or more compartments. An example of first drawer insert 111 is a bin with a plurality of compartments (e.g., for storing a plurality of condiments). Second drawer insert 112 may be configured for securely storing stacks of cups and carafes during taxiing and flight. Third drawer insert 113 may similarly be configured for securely storing bottles in an upright orientation during taxiing and flight. Fourth drawer insert 114 may be an insulated compartment configured for storing ice. For example, drawer insert 114 includes a double-walled bin for providing insulation (see e.g., bin 163, FIG. 4).

Open storage bin 120 is aligned horizontally beneath fourth drawer insert 114 and open cabinet 170. Additional modular storage inserts may be provided in open storage bin 120. For example, a first divider 126 and a second divider 127 may be adjustably positioned for separating portions of open storage bin 120 (see also FIG. 9). The different portions may remain open or accept modular storage inserts such as a trash bin 121 and a doubled-walled bin 122 for ice storage. As depicted in FIG. 1, an open portion 123 is provided without a modular storage insert but may be capable of accepting another storage insert or any other appropriately sized item.

In certain embodiments, a pull-out surface (not shown) may be included amongst the drawer inserts 111-114 to provide a working surface, such as a cutting board, that is conducive to preparing food and beverages. Upon retrieving the pull-out surface from substructure 105, a locking mechanism may be included to maintain the pull-out surface in an extended configuration while in use.

Open cabinet 170 is defined by a lower supporting surface 175, by a side wall 176, and by a back wall 177. In certain embodiments, lower supporting surface 175 is substantially level. Back wall 177 extends upwardly and inwardly to substantially conform with the shape of an interior cabin wall. For example, back wall 177 may be a back portion of open cabinet 170 or a curved back wall. Lower supporting surface 175, side wall 176, and back wall 177 may be protected with a protective liner, such as a cargo-liner having abrasion resistant surfaces. Further, back wall 177, in some embodiments, includes a protective liner having molded ribs 150.

Additional features that enhance versatile utility are included in open cabinet 170. For example, lights 132 may include recessed pin lights and/or a recessed strip light. Lights 132 may further include light-emitting diodes (LEDs), such as LED pin lights intended for task lighting and/or a plurality of LEDs configured longitudinally along a flexible strip, string, or tape intended for ambiance lighting. A retractable rod 140 may be deployed for use as a garment hanger and retracted when not in use (e.g., by rotating and counter-rotating). Beneath open storage bin 120 is a toe-kick 180, which includes a recessed portion to enable a user's feet to partially extend beneath open storage bin 120 when it is closed. Toe-kick 180 may be covered with a durable and malleable material such as rubber.

Cargo may be stored in open cabinet 170 and secured using built-in equipment. For example, straps and/or cargo tie-down netting (not shown) are used to tie down cargo to one or more recessed receptacles. In certain embodiments, recessed receptacles 171 are housed in lower supporting surface 175 for receiving the straps and/or netting (see e.g., FIGS. 1 and 2). In some embodiments, recessed receptacles 172 are located in side wall 176 (see e.g., FIGS. 1 and 3). As depicted in FIG. 1, lower supporting surface 175 includes four recessed receptacles 171, but modular refreshment center 100 may include greater than or less than four receptacles 171, without departing from the scope hereof. Similarly, recessed receptacles 172 may be located in alternative portions of open cabinet 170, such as back wall 177, without departing from the scope hereof.

Figure 2:
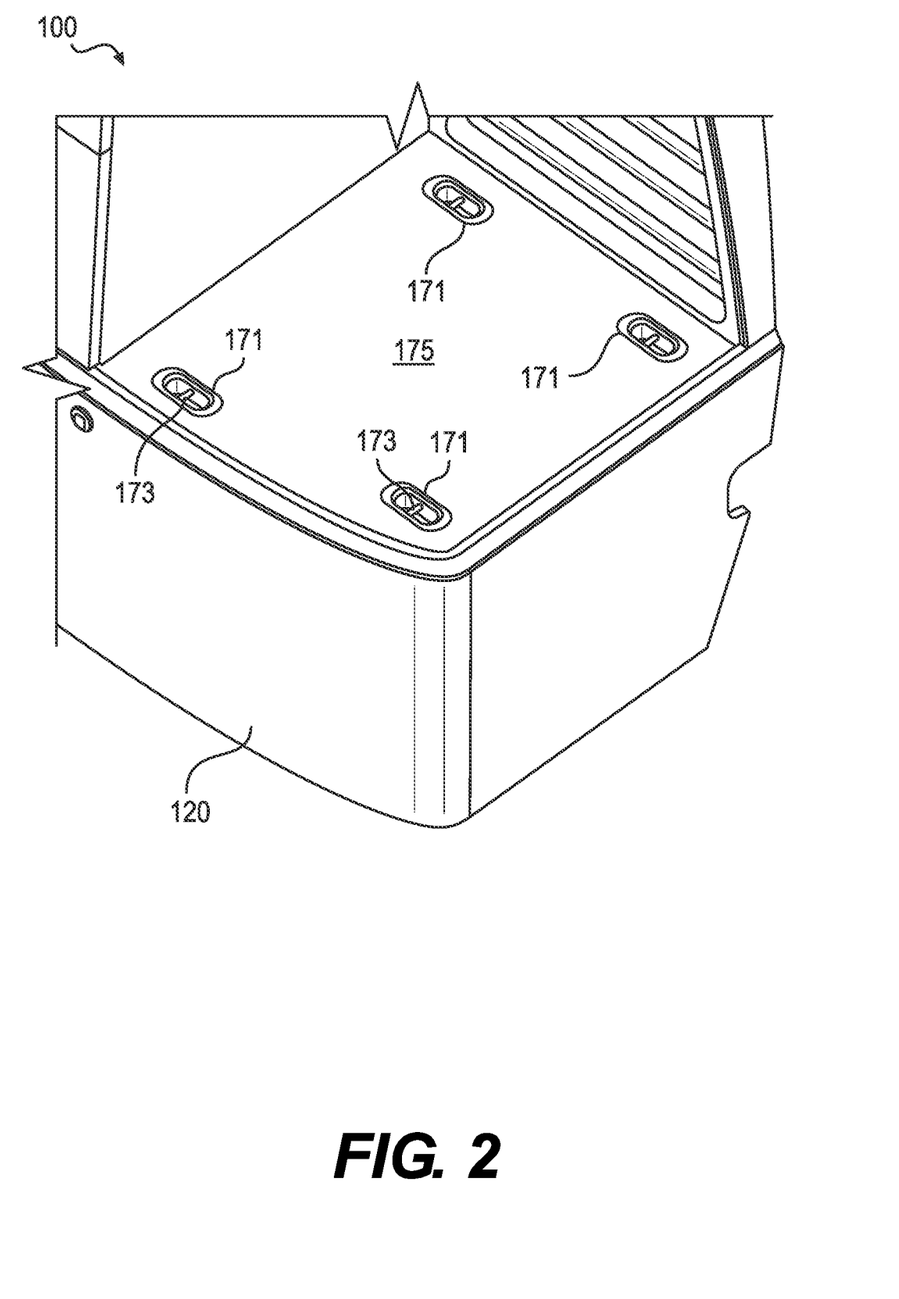
FIG. 2 is a close-up perspective view of a lower supporting surface of the modular refreshment center of FIG. 1.

FIG. 2 is a perspective view of lower supporting surface 175 having four recessed receptacles 171. Each of recessed receptacles 171 includes a crossbar 173 inside the receptacle (not all crossbars are enumerated for clarity of illustration). A space exists underneath crossbar 173 such that a strap, clip, carabiner, or similar device may be attached to crossbar 173 for securing tie-downs, straps, and netting. By being recessed inside recessed receptacle 171, crossbar 173 does not protrude into open cabinet 170 nor interfere with items placed on lower supporting surface 175.

Figure 3:
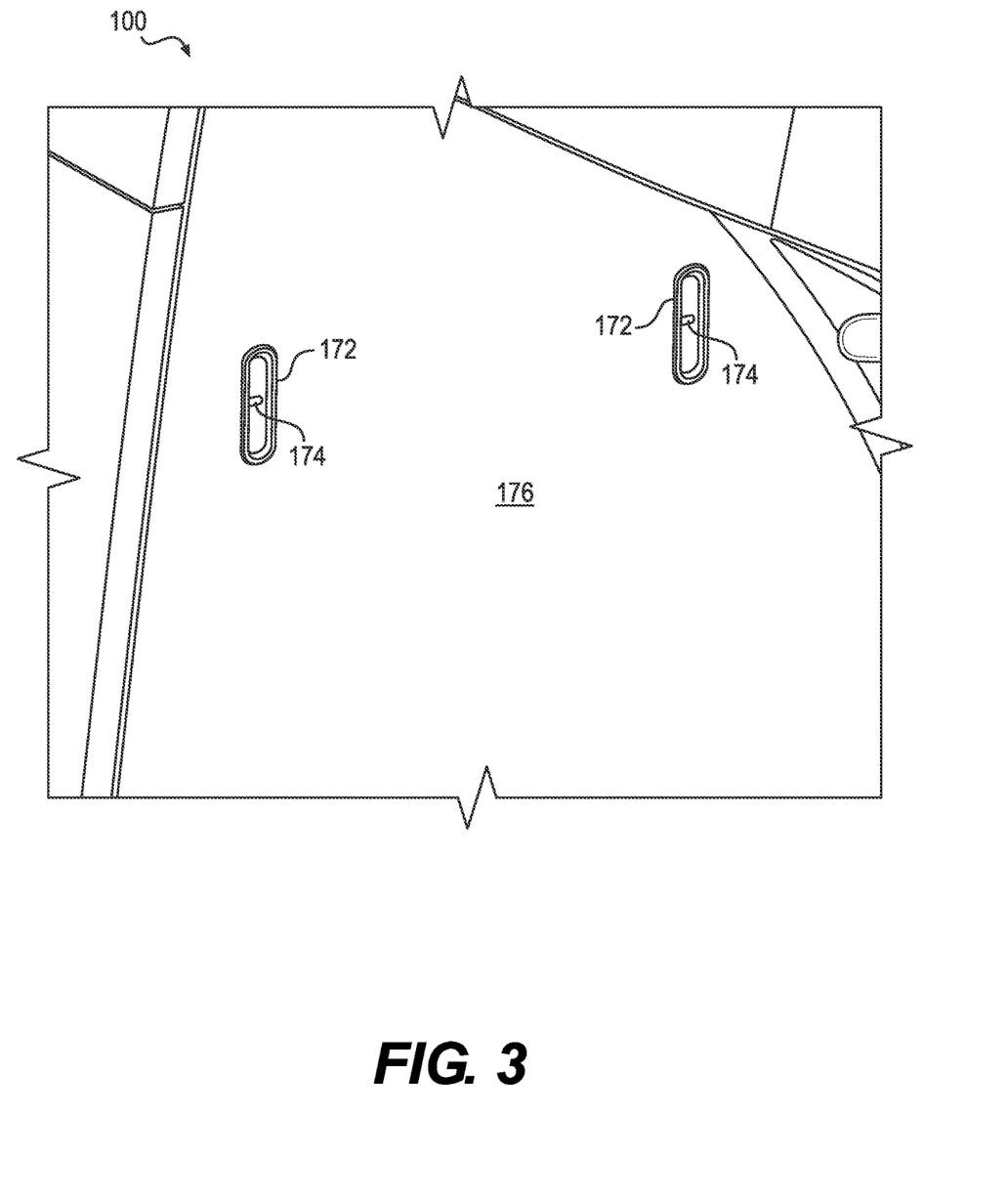
FIG. 3 is a close-up view of recessed receptacles located in a side wall of the modular refreshment center of FIG. 1.

FIG. 3 is a close-up view of recessed receptacles 172 located in side wall 176. A crossbar 174 is an example of crossbar 173, FIG. 2 located in recessed receptacles 172 for securing tie-downs, straps, and netting by attachment with straps, clips, and carabiners. By being recessed within recessed receptacle 172, crossbar 174 does not protrude into open cabinet 170 nor interfere with items placed hanging from retractable rod 140.

Figure 4:
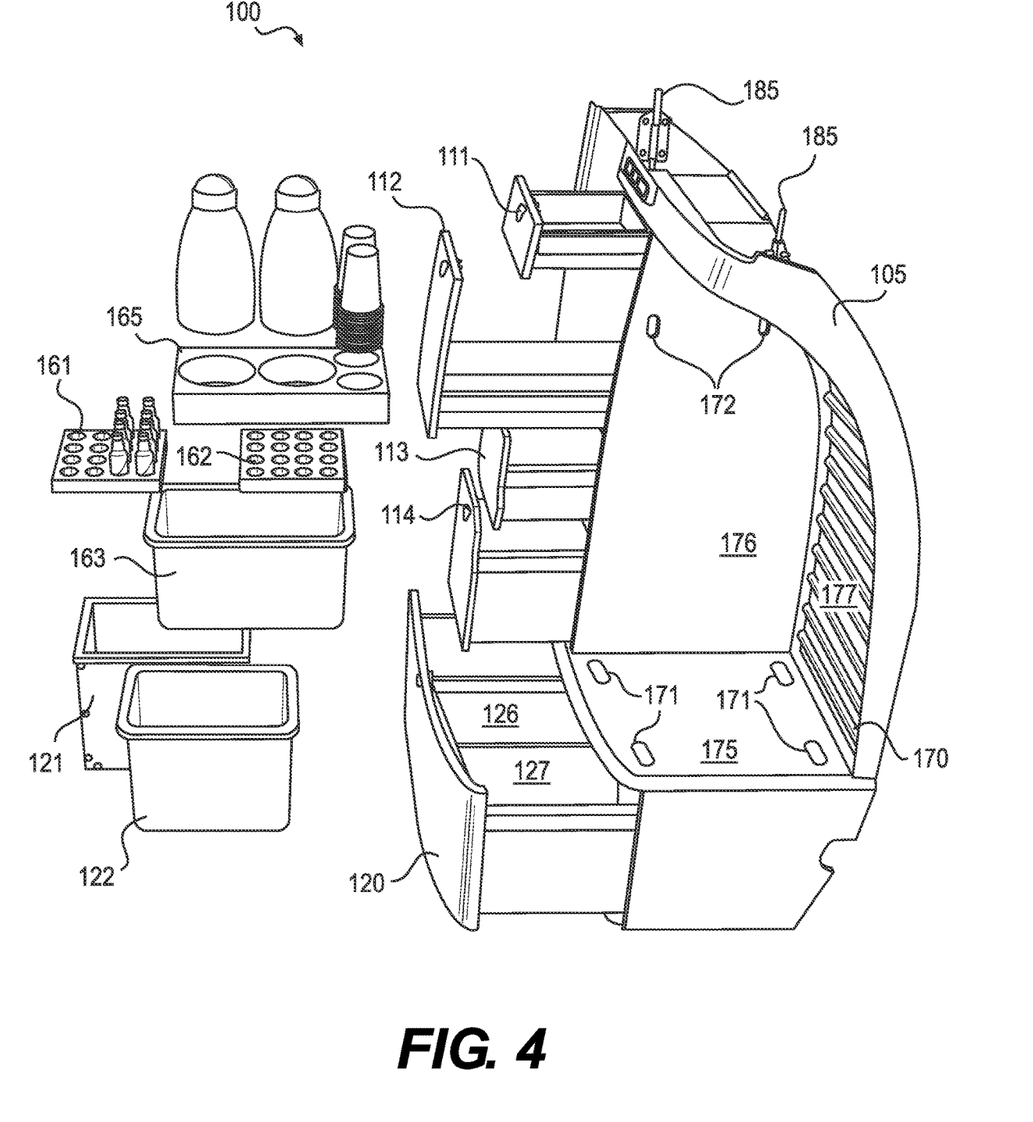
FIG. 4 is an exploded side view of the modular refreshment center of FIG. 1.
Figure 9:
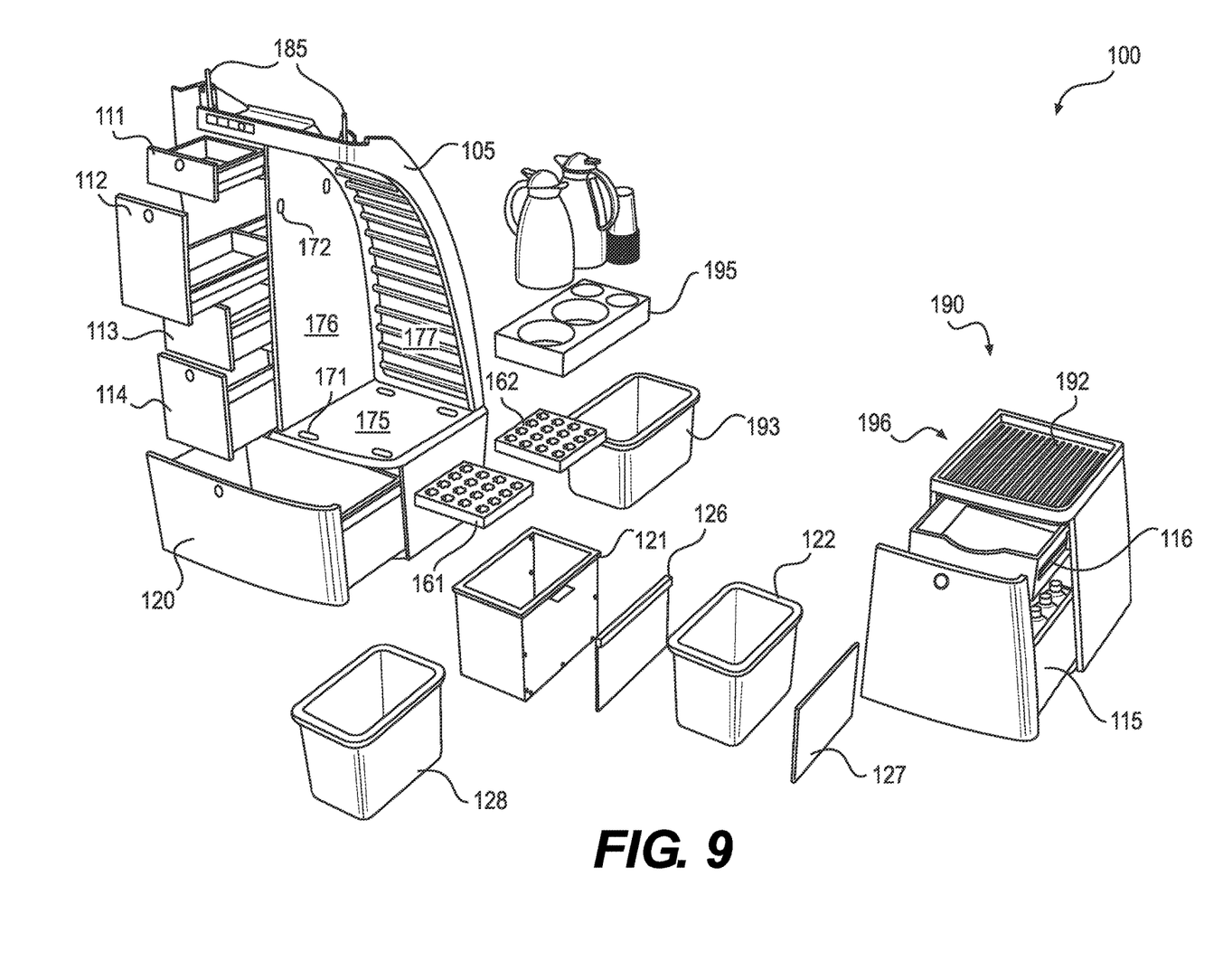
FIG. 9 is an exploded view of the modular refreshment center and the optional modular storage unit of FIG. 5.

FIG. 4 is an exploded side view of modular refreshment center 100. In certain embodiments, drawer inserts 111-114 may include interchangeable liners, such as molded liners, that enable further customization to accommodate a variety of functions (e.g., to hold eating utensils, condiments, liquor miniature bottles, water bottles, wine glasses, or carafes). Exemplary interchangeable liners depicted in FIG. 4 include a molded liner 165 adapted to hold two carafes upright and to hold two stacks of cups and configured to insert into drawer insert 112. Drawer insert 113 is configured to receive a first molded liner 161 and a second molded liner 162 each adapted to hold a plurality of bottles upright. Double-walled bin 163 provides insulation for storing ice in fourth drawer insert 114. Molded liners 161, 162, and 165 are also depicted in FIG. 9. Because drawer inserts 111-114 may be rapidly exchanged with compatible inserts that provide alternative interior liner configurations, customization of the modular refreshment center 100 may be provided for individual flights.

Figure 5:
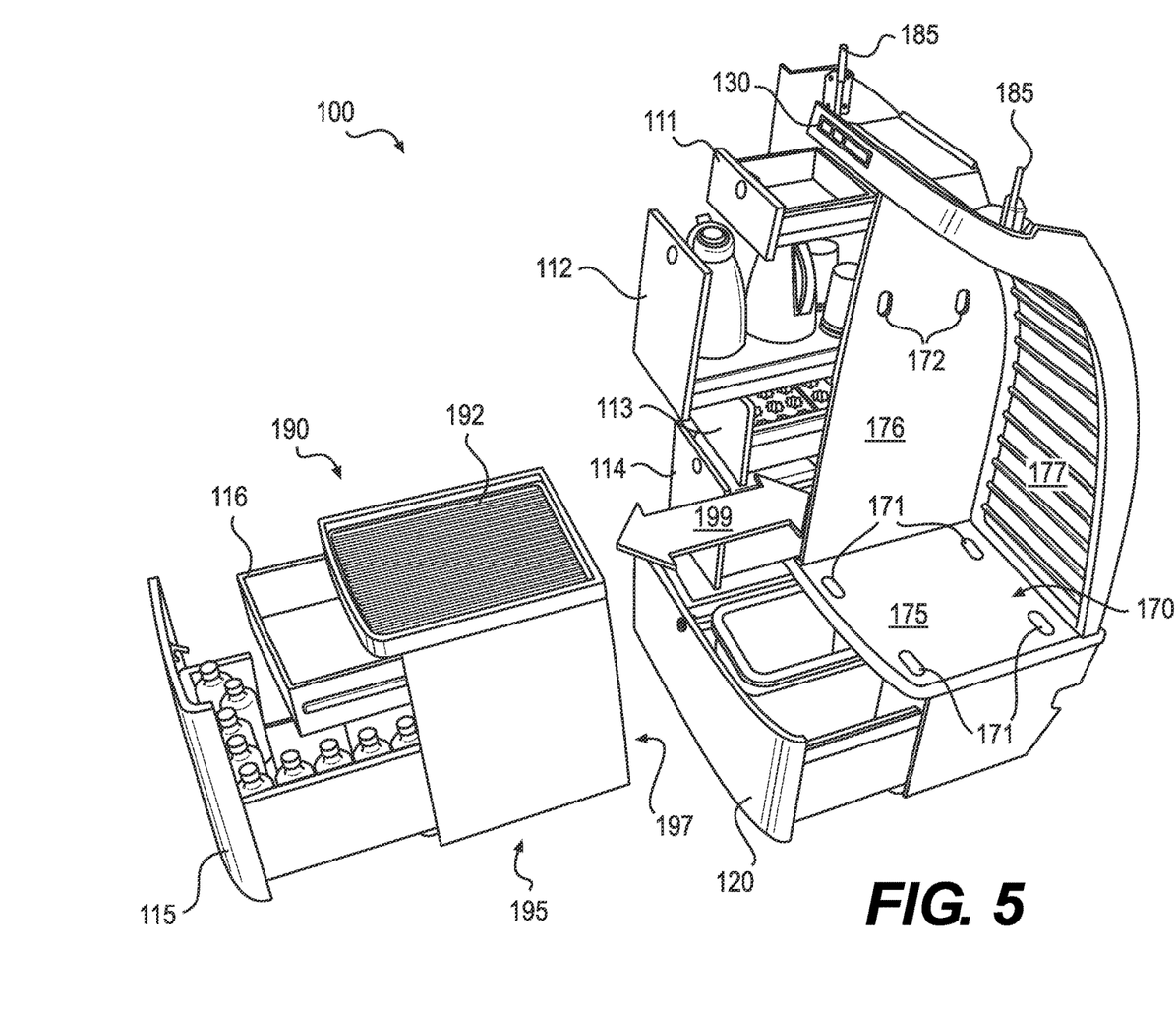
FIG. 5 depicts one embodiment of an optional modular storage unit removed from the modular refreshment center.

FIG. 5 depicts an optional modular storage unit 190 removed from modular refreshment center 100. Modular storage unit 190 is, in certain embodiments, configured for installing upon the lower supporting surface 175 in open cabinet 170. As indicated by arrow 199, modular storage unit 190 may be installed and uninstalled as needed. Top surface 192 may be configured as a work surface or storage surface for setting small appliances or personal items. Optional features of modular storage unit 190 may include drawers, smart phone docking stations, and small appliances such as coffee/espresso makers. Electrical power may be provided to modular storage unit 190 via a battery pack or by electrical connection through substructure 105. As depicted in FIG. 5, a main drawer 115 and a top-drawer insert 116 may be used for providing additional storage. Other configurations for modular storage unit 190 may of course be contemplated, especially since the main advantage provided by unit 190 is that it is removable, thereby enabling exchange with a compatible unit providing alternative features.

Figure 6:
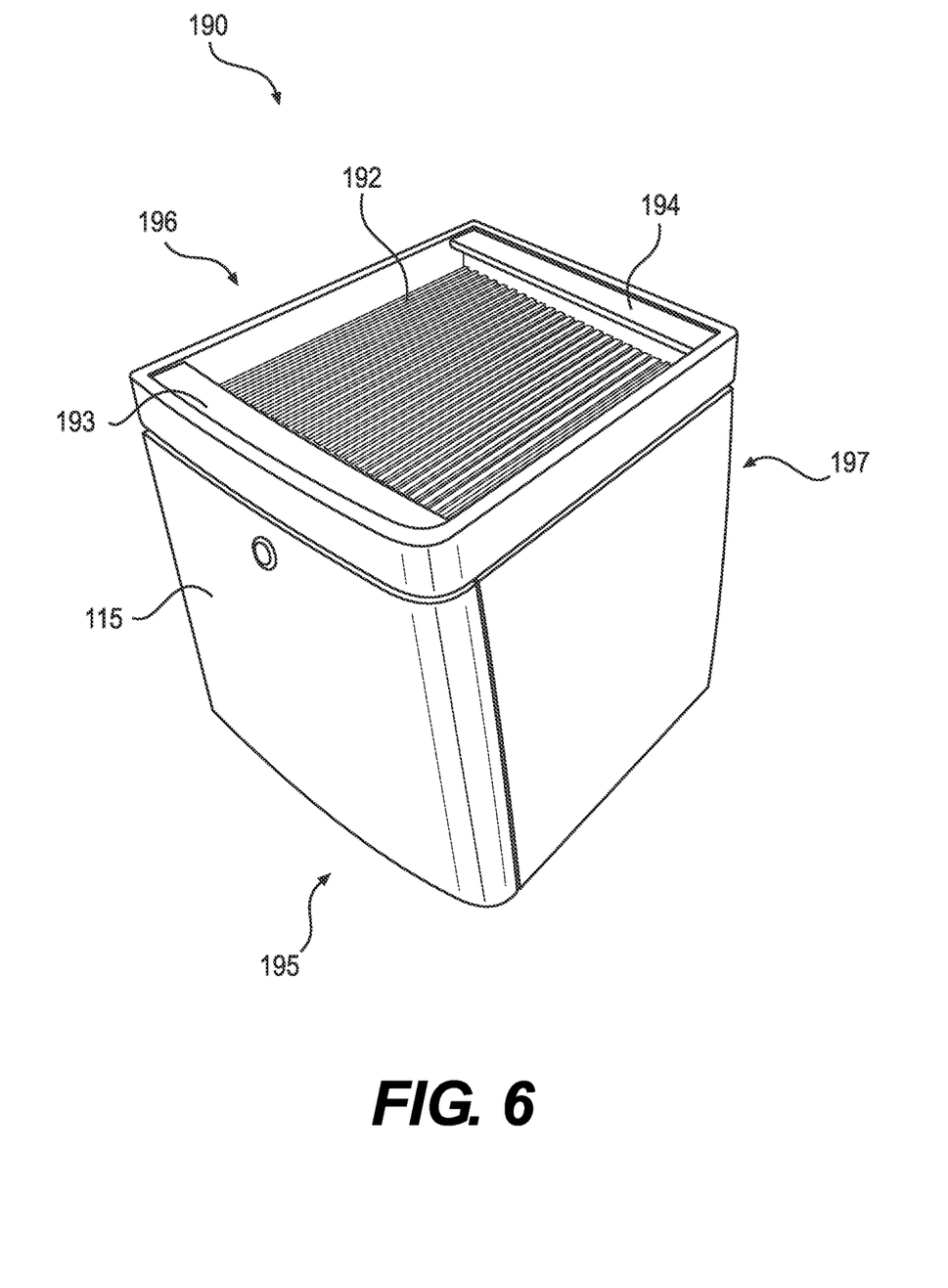
FIG. 6 is a perspective view of an optional modular storage unit, in an embodiment.
Figure 8:
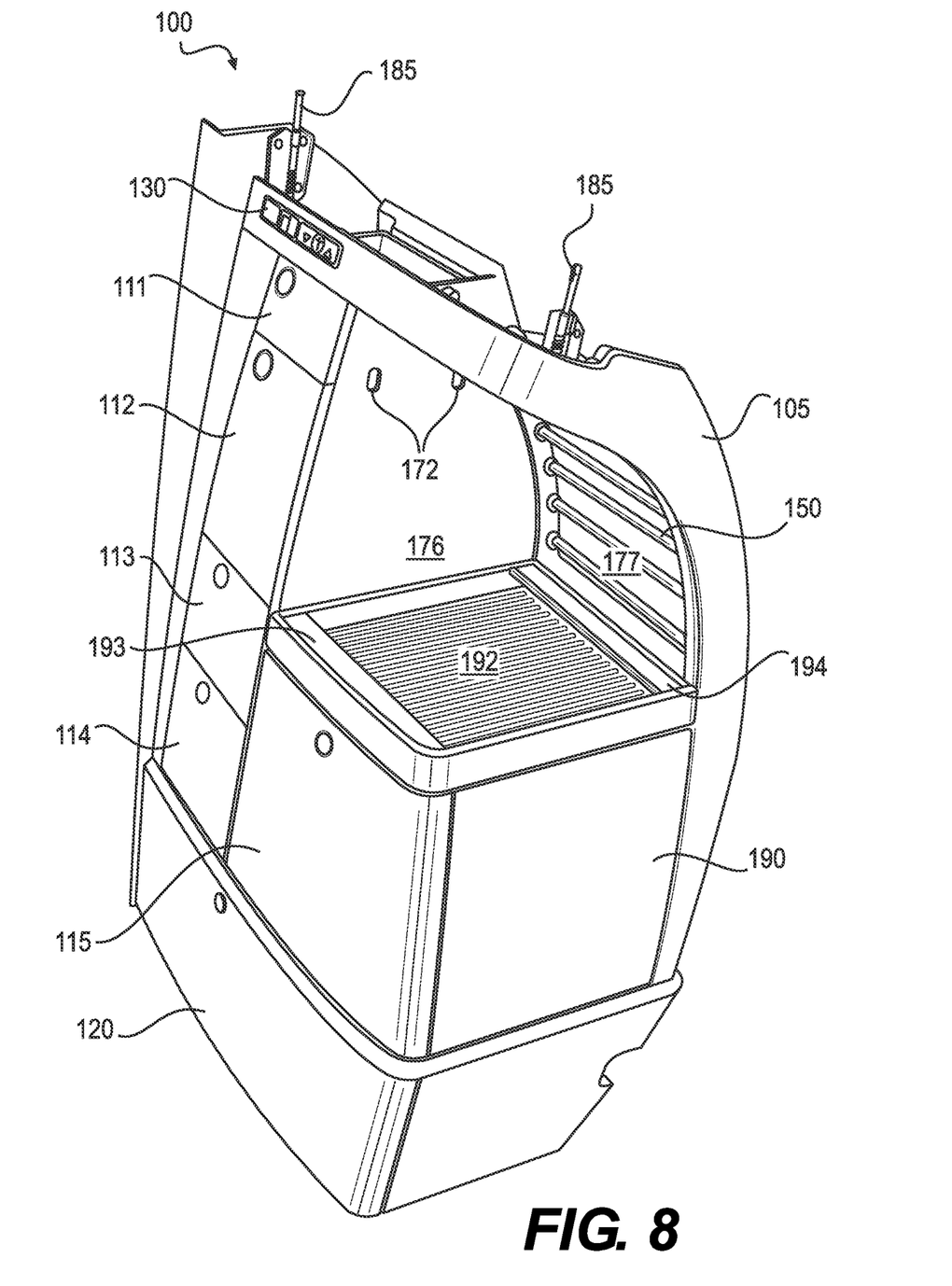
FIG. 8 is a perspective view of the optional modular storage unit of FIGS. 6 and 7 installed in the modular refreshment center of FIG. 1.

FIG. 6 is a perspective view of optional modular storage unit 190 having a first handle 193 and a second handle 194. First and second handles 193, 194 enable modular storage unit 190 to be installed onto substructure 105 (as depicted in FIG. 8) and uninstalled by hand. Modular storage unit 190 provides the user with the capability to easily and quickly change the functionality of the modular refreshment center 100 without needing to purchase and swap-out an entirely different substructure. This modularity enhances the ability to customize the aircraft cabin depending on mission-specific needs of a flight, where utility, weight, and personal preferences are important.

Modular storage unit 190 is configured for receipt by open cabinet 170, which serves as a module-accepting portion of modular refreshment center 100. In other words, modular unit 190 provides a module having exposed surfaces upon installation, such that the exposed surfaces are adapted to match a profile existing in open cabinet 170. The exposed surfaces may include (i) a base 195 adapted to rest on lower supporting surface 175, (ii) a side wall 196 adapted to abut side wall 176, and (iii) a rear wall 197 adapted to abut the upwardly and inwardly extending back wall 177.

Figure 7:
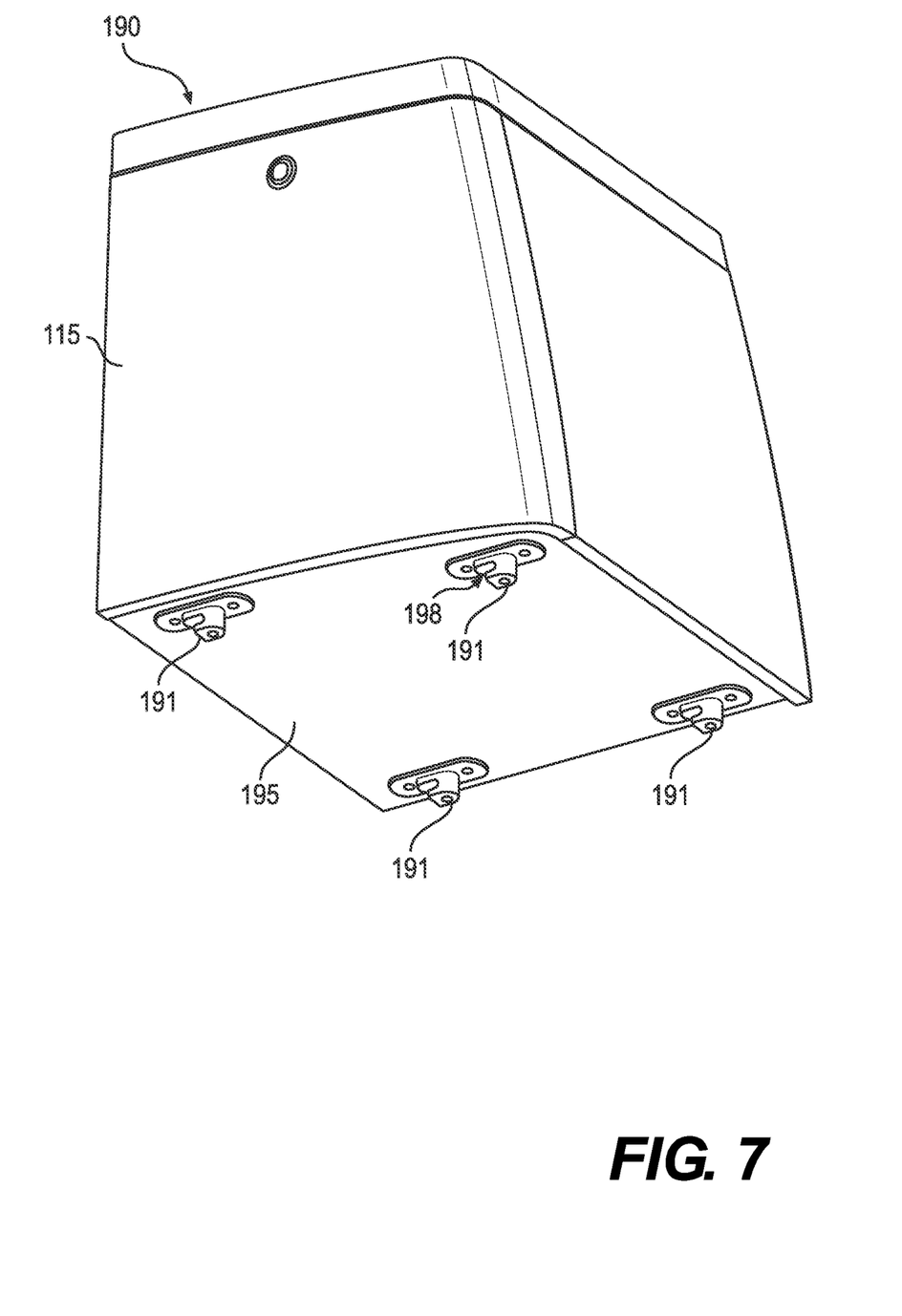
FIG. 7 is another perspective view of the optional modular storage unit of FIG. 6.

FIG. 7 is a perspective view of base 195 of optional modular storage unit 190. For securing modular storage unit 190 in open cabinet 170, one or more quick disconnect or other interlocking features may be built into open cabinet 170 for receiving corresponding features on modular storage unit 190. In certain embodiments, recessed receptacles 171, which may be used for connecting straps or netting to tie down cargo as described above, are also adapted to receive interlocking features of modular storage unit 190. In the embodiment depicted in FIG. 7, base 195 includes four protrusions 191 adapted to insert into a corresponding one of recessed receptacles 171 in lower supporting surface 175 when modular storage unit 190 is installed in open cabinet 170. While the protrusions are inserted into recessed receptacles 171, lateral movement of modular storage unit 190 is prevented (see FIG. 12). Each of protrusions 191 include a slot 198 adapted to receive a respective crossbar 173. Not all slots 198 are enumerated in FIG. 7 for clarity of illustration. Following insertion of protrusions 191 into the respective receptacles 171, modular storage unit 190 may be secured within open cabinet by inserting crossbars 173 into corresponding slots 198. In embodiments, modular storage unit 190 is slid in a forward direction to insert crossbars 173 into slots 198 (see FIG. 12). While the crossbars 173 are inserted into corresponding slots 198, movement of modular storage unit 190 in the forward and upward directions is prevented. In some embodiments, a passive locking assembly is also used to further secure modular storage unit 190 within open cabinet 170 (see e.g., FIGS. 10 and 11 described below).

FIG. 8 is a perspective view of modular refreshment center 100 with modular storage unit 190 installed. When closed, drawer inserts 111-114, main drawer 116, and open storage bin 120 provide an aesthetically appealing and visually unifying façade. Retractable rod 140 is preferably stowed in the retracted position when modular storage unit 190 is installed. Recessed receptacles 172 enable tie-downs, straps, and netting to be attached for securing small cargo (e.g., on top of modular storage unit 190).

FIG. 9 is an exploded view of modular refreshment center 100 and optional modular storage unit 190. Modular components of open storage bin 120 include trash bin 121, first and second dividers 126, 127, doubled-walled bin 122. An additional doubled-walled bin 128 is also depicted, which may optionally be installed in open portion 123 (see e.g., FIG. 1).

In a first utilization mode, the lower portion of open cabinet 170 may remain open (e.g., as depicted in FIG. 1). With modular storage unit 190 uninstalled, modular refreshment center 100 is adapted for hanging garments from rod 140 and for storing carry-on luggage (e.g., small suitcases, briefcases, and laptop cases) or small to medium-sized insulated containers (e.g., coolers). Luggage and containers may be secured by tying down with straps and/or netting that connect to recessed receptacles 171, 172. This configuration may be well suited for business travelers, for example.

In a second utilization mode, modular storage unit 190 is installed, making modular refreshment center 100 adapted for increased access to consumables (e.g., for long one-day flights where passengers have less luggage but an increased need for food, drinks, snacks or other daytrip items).

An aircraft outfitted with substructure 105 may optionally include extra modular storage units 190 (e.g., having different configurations), which allows rapid reconfiguration of modular refreshment center 100 to expand its capability for accommodating storage, work surface areas, and increased functionality (such as accommodating catering trays, extra ice, food and drinks, and/or trash storage).

Figure 10:
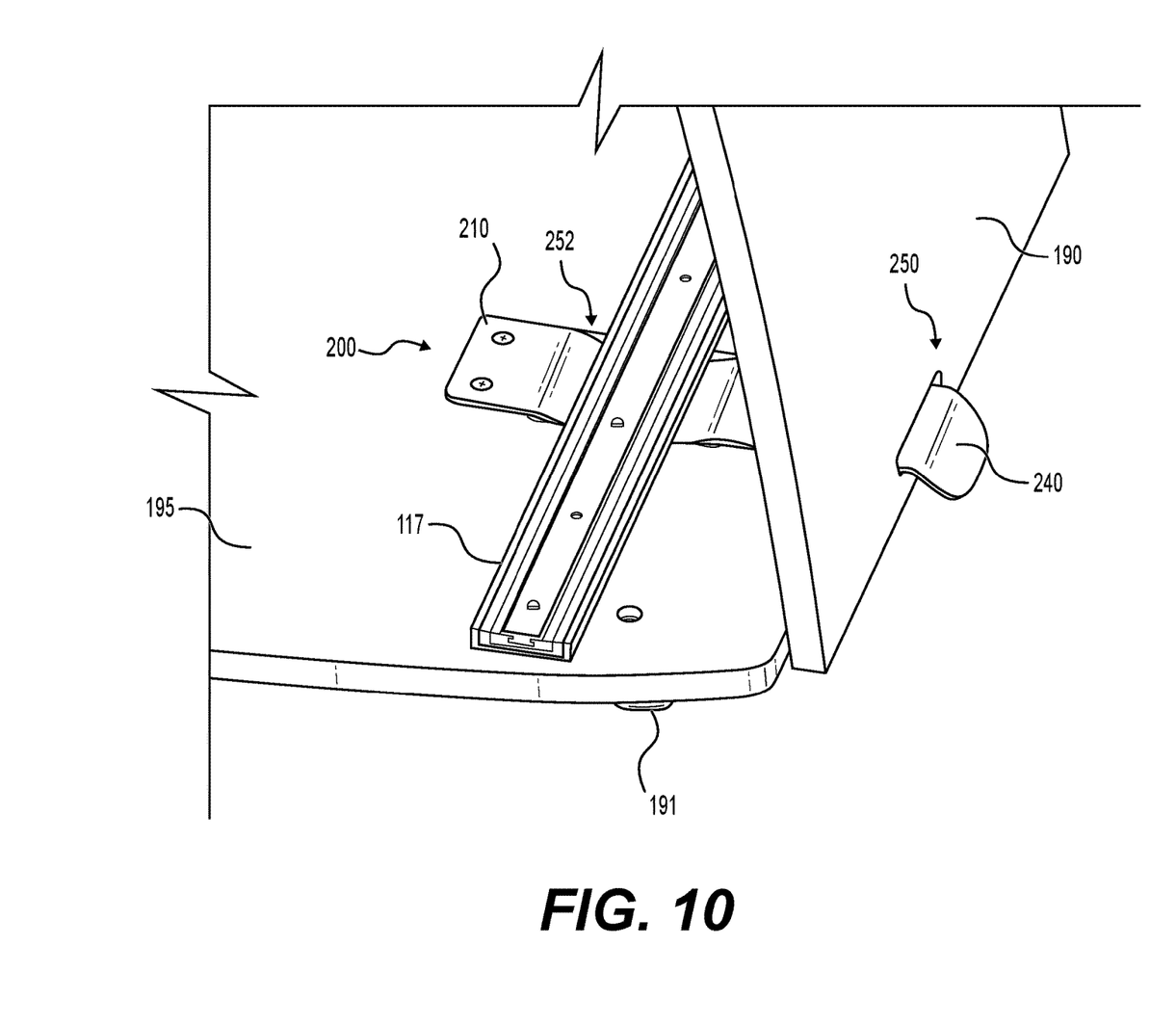
FIG. 10 is a perspective view of a locking assembly for securing the optional modular storage unit of FIG. 5 in some embodiments.

FIG. 10 shows a locking assembly 200 integrated with modular storage unit 190 for some embodiments. Main drawer 115 is removed from modular storage unit 190 in the FIG. 10 view to enable viewing of locking assembly 200 mounted to an interior surface of base 195. A lever arm 210 is mounted to the interior surface of base 195. In embodiments, lever arm 210 is a bent piece of flat material. In certain embodiments, lever arm 210 is made of metal, such as aluminum or an aluminum alloy. Lever arm 210 extends outwardly through an opening 250 in an aft wall of modular storage unit 190. A free end 240 of lever arm 210 protrudes through opening 250 to outside modular storage unit 190 making free end 240 accessible to a user for releasing locking assembly 200, as further described below. In embodiments, lever arm 210 is bent beneath a drawer rail 117 of modular storage unit 190. Drawer rail 117 is configured to accept a rail on an underside of main drawer 115.

Figure 11:
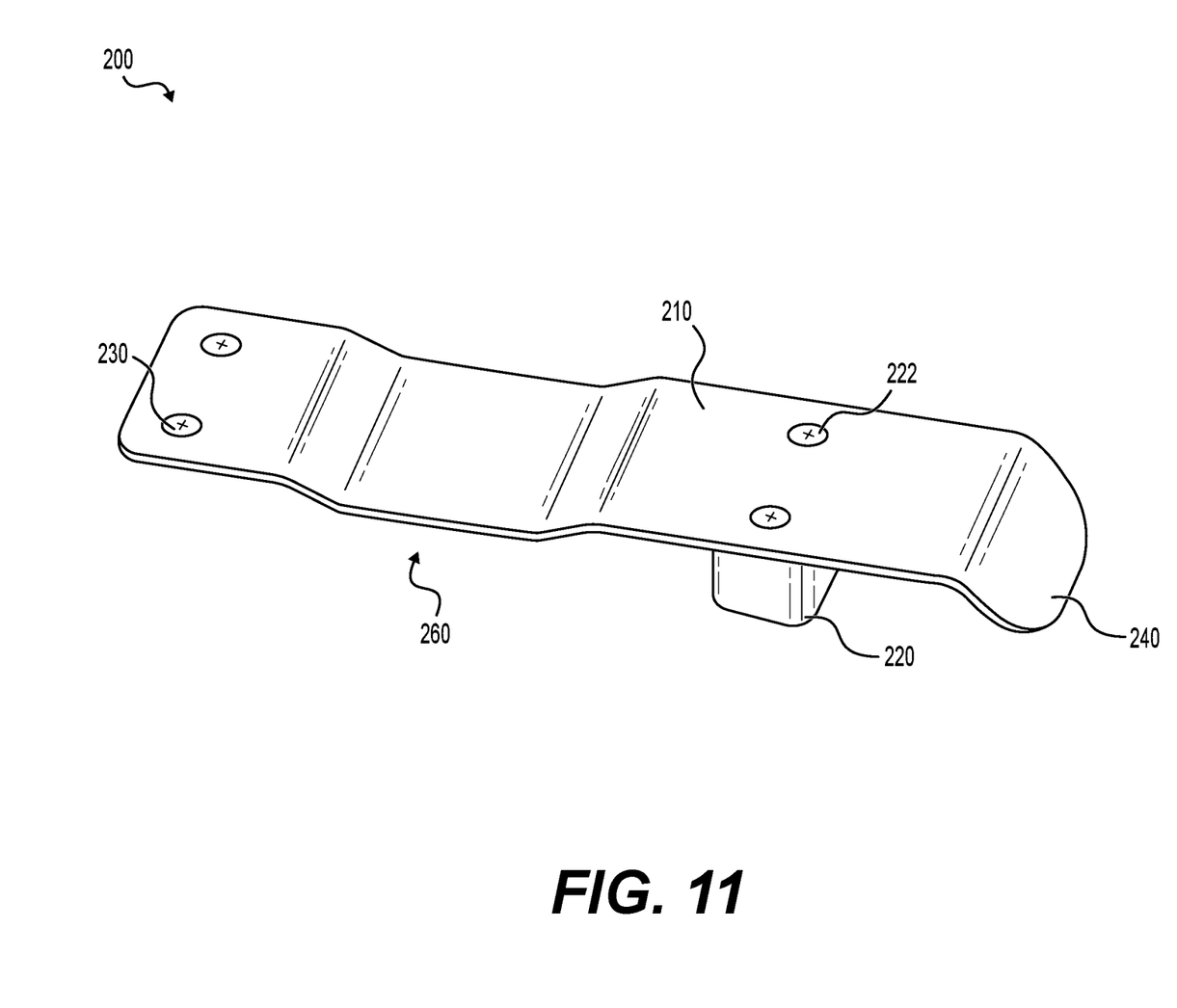
FIG. 11 is a perspective view of the locking assembly of FIG. 10.

FIG. 11 depicts some components of locking assembly 200 removed from modular storage unit 190. Lever arm 210 has a U-shaped region 260 that is bent downwardly compared to adjacent portions of lever arm 210. The U-shaped region 260 is formed in lever arm 210 to avoid contact with drawer rail 117 mounted on the interior surface of base 195 as best viewed in FIG. 10. A pocket 252 is formed in the interior surface of base 195 to accommodate U-shaped region 260 (see FIGS. 10 and 13). Pocket 252 may be a slot, groove, or opening, without departing from the scope hereof. One or more fasteners 230 (e.g., one or more screws, or one or more bolts) are used to mount lever arm 210 to the interior surface of base 195.

A protruding member 220 extends downwardly from a bottom side of lever arm 210. Protruding member 220 may be any appendage configured to extend downward. A hole 262 (see FIG. 13) is formed in base 195 such that protruding member 220 may interact with lower supporting surface 175 when modular storage unit 190 is installed, as described below in connection with FIG. 12. In embodiments, protruding member 220 is an appendage formed of plastic (e.g., nylon) that is mounted to an underside of lever arm 210 via one or more fasteners 222. In some embodiments, protruding member 220 is has a rectangular cross-section and a bottom face machined at an angle, such that an edge adjacent plate 270 is longer to ensure contact with lower supporting surface 175 adjacent plate 270. Free end 240 is bent downwardly to provide a handle that is configured to be actuated by lifting upwardly. A user may lift upwardly on free end 240 with one or more fingers, which deflects lever arm 210 and raises protruding member 220 for unlatching modular storage unit 190. Lever arm 210 is secured via one or more fasteners 230 at a secured end which is opposite free end 240. A length of lever arm 210, as well as the thickness and material of lever arm 210 determine the amount of force applied at free end 240 to deflect protruding member 220 sufficiently upwards for releasing modular storage unit 190.

Figure 12:
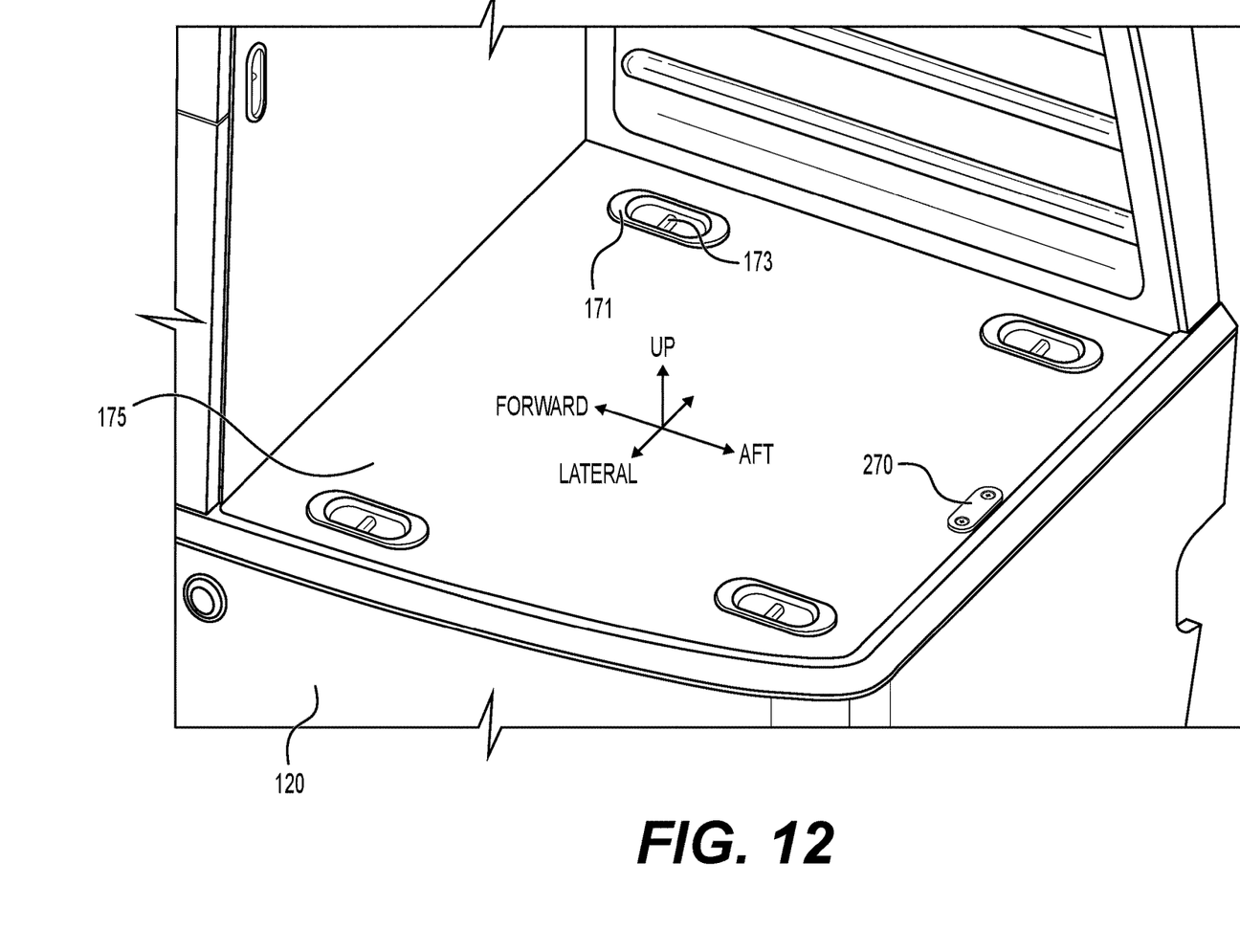
FIG. 12 is a perspective view of a plate on a supporting surface for use with the locking assembly of FIG. 10.

FIG. 12 shows open cabinet 170 of modular refreshment center 100, similar to the embodiment shown in FIG. 2, but with a plate 270 mounted to a top surface of lower supporting surface 175. Plate 270 is configured to interact with protruding member 220 for embodiments having locking assembly 200. Plate 270 may be mounted to lower supporting surface 175 via one or more fasteners (e.g., one or more screws or bolts). In certain embodiments, plate 270 is positioned immediately adjacent an aft end of open cabinet 170, as depicted in FIG. 12, for aligning with protruding member 220 when modular storage unit 190 is installed. Specifically, modular storage unit 190 may be installed from the aft end of open cabinet 170 and slid forward such that each slot 198 in protrusion 191 engages with a crossbar 173 in recessed receptacle 171, respectively. Each slotted protrusion (i.e., protrusion 191 having slot 198) faces forward during installation. As modular storage unit 190 is placed on lower supporting surface 175, protruding member 220 sits on top of plate 270. As modular storage unit 190 is slid forward, protruding member 220 slides past plate 270 and is then seated adjacent plate 270. Specifically, protruding member 220 is pushed downwardly by lever arm 210 due to the deflection of the lever arm such that protruding member 220 touches lower supporting surface 175 immediately forward of plate 270. Due to the deflection of lever arm 210, seating of protruding member 220 adjacent plate 270 occurs automatically when modular storage unit 190 is slid into place, which provides a passive locking assembly that does not require any action by the user to lock modular storage unit 190 when installed. In embodiments, modular storage unit 190 may be slid forward by about 0.5-inch or less to fully engage crossbars 173 in slots 198 and have protruding member 220 slide past plate 270.

While seated immediately forward of plate 270, protruding member 220 abuts against plate 270 preventing movement of modular storage unit 190 in the aft direction. In combination with crossbar 173 slotted into each slot 198, which prevents forward and upward movement, and insertion of each protrusion 191 inserted into each respective recessed receptacle 171, which prevents lateral movement, modular storage unit 190 is completely secured from moving in all directions.

To release modular storage unit 190, a user may lift upwardly on free end 240 of lever arm 210, which is able to move upwards in opening 250 (see FIG. 10). The upward motion of free end 240 raises protruding member 220 above plate 270. In embodiments, opening 250 has a height that is just tall enough for protruding member 220 to clear plate 270. In this manner, lever arm 210 presses against a top side of opening 250 when free end 240 is lifted upwards. By pressing against the top side of opening 250, movement of lever arm 210 stops, which provides a cue making the user aware that the release of locking assembly 200 via lever arm 210 is complete and that modular storage unit 190 may be moved out of open cabinet 170. Additionally, the free end 240 of lever arm 210 may also serve as a handle for lifting modular storage unit 190. Once locking assembly 200 has been released, modular storage unit 190 may then be slid aft and lifted out of open cabinet 170.

Figure 13:
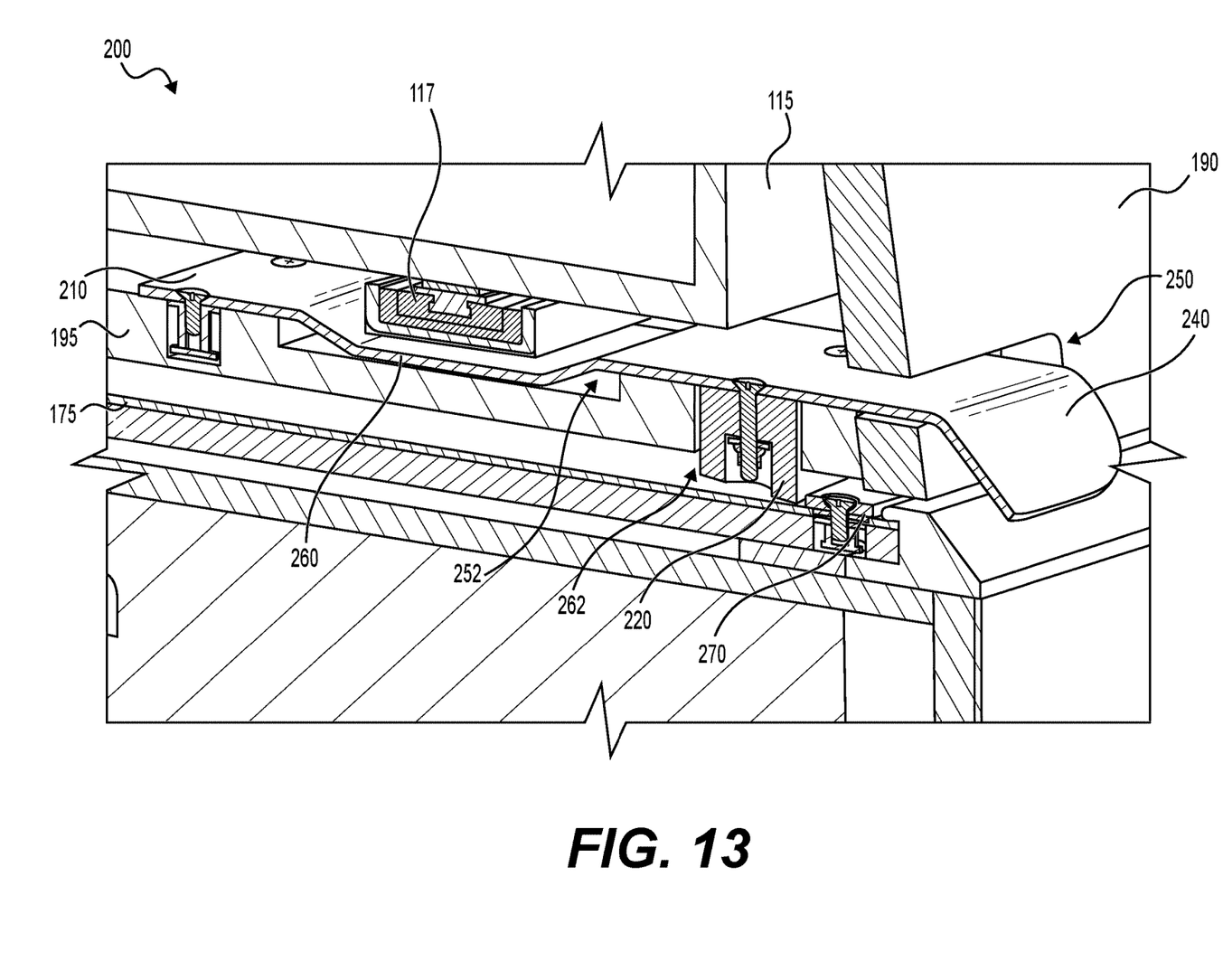
FIG. 13 is a cross-sectional view of the locking assembly of FIG. 10 integrated with the optional modular storage unit of FIG. 5 in some embodiments.

FIG. 13 is a cross-sectional view of locking assembly 200 integrated with modular storage unit 190. In the FIG. 13 illustration, modular storage unit 190 is fully installed on lower supporting surface 175 and locking assembly 200 is in a locked configuration. Specifically, protruding member 220 is extended through hole 262 and is in contact with lower supporting surface 175 adjacent plate 270, thereby securing modular storage unit 190 from movement in the aft direction. Main drawer 115 is visible on drawer rail 117, and u-shaped region 260 is curved beneath drawer rail 117 and within pocket 252.

As one of skill in the art will recognize, the orientation of modular storage unit 190 may be varied without departing from the scope hereof. For example, rather than installation in the forward direction and removal in the aft direction, installation may occur in a first direction with removal occurring in a second direction opposite the first direction. Slot 198 of each protrusion 191 (see FIG. 7) faces the first direction and the locking assembly 200 prevents movement of modular storage unit 190 in the second direction.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

We claim:

1. A locking assembly for a modular storage unit, comprising:
   a lever arm having a secured end and a free end, the secured end being mounted inside a base of the modular storage unit;
   an opening in a side wall of the modular storage unit, wherein the free end is configured to extend through the opening;
   a protruding member that extends downward beneath a bottom side of the lever arm;
   a hole in the base configured to receive the protruding member; and
   a plate mounted to a supporting surface,
   wherein the protruding member is configured to be seated adjacent the plate and touching the supporting surface when the modular storage unit is installed on the supporting surface thereby securing the modular storage unit, and wherein the lever arm is configured to deflect upwards when the free end is lifted, thereby raising the protruding member above the plate for releasing the modular storage unit.

2. The locking assembly of claim 1, wherein the opening has a height configured for the lever arm to clear the plate when the lever arm is lifted via the free end for releasing the modular storage unit.

3. The locking assembly of claim 1, wherein the free end of the lever arm is bent downwardly such that the free end of the lever arm extends outwardly and downwardly from the opening.

4. The locking assembly of claim 1, wherein the free end of the lever arm is configured as a handle for lifting the modular storage unit when the locking assembly is released.

5. A locking assembly for a modular storage unit, comprising:
- a lever arm having a secured end and a free end, the secured end being mounted inside a base of the modular storage unit;
- an opening in a side wall of the modular storage unit, wherein the free end is configured to extend through the opening;
- a protruding member that extends downward beneath a bottom side of the lever arm;
- a hole in the base configured to receive the protruding member; and
- a plate mounted to a supporting surface,
- wherein the protruding member is configured to be seated adjacent the plate and touching the supporting surface when the modular storage unit is installed on the supporting surface thereby securing the modular storage unit, and
- wherein the lever arm is configured to press against a top side of the opening when the free end is lifted, thereby making a user aware that the locking assembly is released.

6. A locking assembly for a modular storage unit, comprising:
- a slotted protrusion that extends beneath a base of the modular storage unit, wherein the slotted protrusion comprises a slot facing a first direction;
- a recessed receptacle housed within a supporting surface, wherein the recessed receptacle comprises a crossbar configured to insert into the slot when the modular storage unit is installed;
- a lever arm having a secured end and a free end, the secured end being mounted inside the base of the modular storage unit and the free end extending through an opening in a side wall of the modular storage unit, wherein the free end is configured to be raised for releasing the modular storage unit;
- a protruding member that extends downward beneath a bottom side of the lever arm and through a hole in the base; and
- a plate mounted to the supporting surface,
- wherein the protruding member is configured to be seated against the supporting surface adjacent the plate when the modular storage unit is installed thereby securing the modular storage unit from moving in a second direction opposite the first direction.

7. The locking assembly of claim 6, wherein the lever arm is configured to deflect upwards when lifted, thereby raising the protruding member above the plate for releasing the modular storage unit.

8. The locking assembly of claim 6, wherein the opening has a height configured for the protruding member to clear the plate when the free end of the lever arm is lifted for releasing the modular storage unit.

9. The locking assembly of claim 6, wherein the free end of the lever arm is bent downwardly such that the free end of the lever arm extends outwardly and downwardly from the opening.

10. The locking assembly of claim 6, wherein the lever arm comprises a U-shaped region that is bent downwardly compared to adjacent portions of the lever arm for avoiding contact with a drawer rail mounted on the base of the modular storage unit.

* * * * *